(12) United States Patent
Fukinbara et al.

(10) Patent No.: US 6,916,498 B2
(45) Date of Patent: Jul. 12, 2005

(54) DEHYDRATED FROZEN CONFECTIONS

(75) Inventors: Itaru Fukinbara, Tokyo (JP); Naoto Watanabe, Okayama (JP); Sadao Tohi, Okayama (JP); Naoko Okada, Okayama (JP)

(73) Assignee: Amano Jitsugyo Co., Ltd., Hiroshima (JP)

( * ) Notice: Subject to any disclaimer, the term of this patent is extended or adjusted under 35 U.S.C. 154(b) by 219 days.

(21) Appl. No.: 10/279,276

(22) Filed: Oct. 24, 2002

(65) Prior Publication Data

US 2003/0113436 A1 Jun. 19, 2003

(30) Foreign Application Priority Data

Oct. 30, 2001 (JP) .................................... P 2001-332529
Aug. 23, 2002 (JP) .................................... P 2002-242857

(51) Int. Cl.⁷ ............................ A23G 3/00; A23G 9/00
(52) U.S. Cl. ................. 426/565; 426/684; 426/385; 426/444
(58) Field of Search ................... 426/565, 384, 426/385, 444, 519, 524

(56) References Cited

U.S. PATENT DOCUMENTS

| | | | | |
|---|---|---|---|---|
| 3,464,834 A | * | 9/1969 | Laskin | 426/385 |
| 4,346,120 A | * | 8/1982 | Morley et al. | 426/565 |
| 4,400,406 A | * | 8/1983 | Morley et al. | 426/565 |
| 4,427,701 A | * | 1/1984 | Morley | 426/36 |
| 4,675,200 A | * | 6/1987 | Serpelloni et al. | 426/567 |
| 5,518,740 A | * | 5/1996 | Costanzo et al. | 426/34 |
| 5,973,212 A | * | 10/1999 | De Sadeleer et al. | 568/852 |

FOREIGN PATENT DOCUMENTS

| | | |
|---|---|---|
| EP | 0 240 326 | * 10/1987 |
| GB | 1042530 | 9/1966 |
| GB | 1206033 | 9/1970 |
| GB | 1 517 912 | 7/1978 |
| JP | 47-19011 | 5/1972 |
| JP | 62-244350 | 10/1987 |
| JP | 362244350 | * 10/1987 |
| JP | 1-218554 | 8/1989 |
| JP | 401218554 | * 8/1989 |

* cited by examiner

Primary Examiner—N. Bhat
(74) Attorney, Agent, or Firm—Akin Gump Strauss Hauer & Feld, LLP

(57) ABSTRACT

A dehydrated frozen confection obtained by freezing and then freeze-drying a starting material containing a milk content and a sweetener content, wherein at least 20% wt of the sweetener content is sugar-alcohol; preferably, the sugar-alcohol is one or more selected from the group consisting of erythritol, xylitol, sorbitol, and mannitol. The frozen confection may also include inulin.

10 Claims, 6 Drawing Sheets

Table 1

|  | Ex.1 | C. Ex.1 |
|---|---|---|
| Fat milk content | 10.8 | 15.0 |
| Nonfat milk solids | 1.1 | 1.5 |
| Defatted milk | 5.7 | 10.0 |
| Sweetener content | 8.0 | 14.0 |
| Egg yolk | 1.4 | 2.5 |
| Emulsifier | 0.1 | 0.1 |
| PSM | 1.2 | — |
| Gelatin | 0.5 | — |
| Water | 71.2 | 56.9 |
| Total | 100.0 | 100.0 |

(Note) 1) Ex. Stands for Example, and C.Ex. stands for Contrasted Example.

2) Each substance, except Water, has its water content excluded.

Fig. 1

Table 1

|  | Ex.1 | C. Ex.1 |
|---|---|---|
| Fat milk content | 10.8 | 15.0 |
| Nonfat milk solids | 1.1 | 1.5 |
| Defatted milk | 5.7 | 10.0 |
| Sweetener content | 8.0 | 14.0 |
| Egg yolk | 1.4 | 2.5 |
| Emulsifier | 0.1 | 0.1 |
| PSM | 1.2 | — |
| Gelatin | 0.5 | — |
| Water | 71.2 | 56.9 |
| Total | 100.0 | 100.0 |

(Note) 1) Ex. Stands for Example, and C.Ex. stands for Contrasted Example.

2) Each substance, except Water, has its water content excluded.

Fig. 2

Table 2

|  | Ex.2 |
|---|---|
| Unprocessed cream | 17.0 |
| Defatted milk | 7.4 |
| Xylitole | 7.4 |
| Egg yolk | 2.6 |
| Emulsifier | 0.1 |
| Water | 65.5 |
| Total | 100.0 |
| OR (%) | 27.1 |
| Cracks | — |

Fig.3

Table 3

| | Ex.3 | Ex.4 | Ex.5 | C.Ex.2 | C.Ex.3 | C.Ex.4 |
|---|---|---|---|---|---|---|
| Unprocessed cream | 21.3 | 21.3 | 21.3 | 17.0 | 17.0 | 17.0 |
| Defatted milk | 5.3 | 5.3 | 5.3 | 7.4 | 7.4 | 7.4 |
| Erythritol | 2.96 | 2.22 | 1.48 | 1.11 | 0.74 | 0.37 |
| | (40) | (30) | (20) | (15) | (10) | (5) |
| Granulated sugar | 4.44 | 5.18 | 5.92 | 6.29 | 6.66 | 7.03 |
| | (60) | (70) | (80) | (85) | (90) | (95) |
| Egg yolk | 2.6 | 2.6 | 2.6 | 2.6 | 2.6 | 2.6 |
| Emulsifier | 0.1 | 0.1 | 0.1 | 0.1 | 0.1 | 0.1 |
| Water | 63.3 | 63.3 | 63.3 | 65.5 | 65.5 | 65.5 |
| Total | 100.0 | 100.0 | 100.0 | 100.0 | 100.0 | 100.0 |
| OR (%) | 39.7 | 66.6 | 45.0 | 42.6 | 30.7 | 22.0 |
| Cracks | — | — | — | ± | ± | ± |

Fig.4

Table 4

|  | Ex.6 | Ex.7 |
|---|---|---|
| Unprocessed cream | 25.0 | 25.0 |
| Defatted milk | 5.3 | 5.3 |
| Erythritol | 3.4(40) | 5.04(60) |
| Lactose | 5.0(60) | 3.36(40) |
| Egg yolk | 2.6 | 2.6 |
| PSM | 1.2 | 1.2 |
| Water | 57.5 | 57.5 |
| Total | 100.0 | 100.0 |
| Cracks | — | — |

Fig. 5

Table 5

| | Ex.8 | Ex.9 |
|---|---|---|
| Unprocessed cream | 25.0 | 25.0 |
| Defatted milk | 5.3 | 5.3 |
| Erythritol | 3.4(40) | 7.4(88) |
| Inulin | 5.0(60) | 1.0(12) |
| Egg yolk | 2.6 | 2.6 |
| PSM | 1.2 | 1.2 |
| Water | 57.5 | 57.5 |
| Total | 100.0 | 100.0 |
| Cracks | — | — |

Fig. 6

Table 6

| | Ex.10 | Ex.11 | Ex.12 | Ex.13 |
|---|---|---|---|---|
| Fat milk content | 12.3 | 12.3 | 12.3 | 11.2 |
| Erythritol | 9.0 | 9.0 | 9.0 | 7.4 |
| Nonfat milk solids | 7.7 | 7.7 | 7.7 | 10.8 |
| Egg yolk | 3.5 | 3.5 | 3.5 | 2.6 |
| PSM | 1.5 | 1.5 | 1.5 | 1.2 |
| Inulin | 1.2 | 1.2 | 1.2 | 1.0 |
| Lactoferrin | 0.2 | 0.2 | 0.2 | 0.2 |
| Flavoring | 0.1 | 0.2 | 0.1 | 0.1 |
| Stabilizer | 0.1 | 0.1 | 0.1 | 0.1 |
| Pigment | — | 0.2 | — | — |
| Cocoa | — | — | 1.5 | — |
| Yogurt culture | — | — | — | 0.1 |
| Water | 64.4 | 64.1 | 62.9 | 65.3 |
| Total | 100.0 | 100.0 | 100.0 | 100.0 |

(note) Each substance, except Water, has its water content excluded.

DEHYDRATED FROZEN CONFECTIONS

BACKGROUND OF THE INVENTION

The present invention relates to dehydrated or freeze-dried confections obtained from a starting material containing a milk content and a sweetener content. In the following description the freeze-dried ice cream represents dehydrated frozen confections.

Freeze-dried ice creams are known as disclosed in Japanese Patent Publication No. 47-19011, Patent Laid-open Applications Nos. 62-244350 and 1-218554. The first-mentioned patent further teaches how to produce freeze-dried confections having various fanciful shapes. The disclosure of each publication is incorporated by reference.

The problem in common with these known processes is that they select the sweetener content without considering the later occurring freeze-drying process. No special care is taken in selecting from granulated sugar, glucose, fructose (fruit sugar), or glutinous starch syrup.

In fact, no ice cream presupposes that they will be freeze-dried at a later stage, and therefore, the ice creams so treated are liable to cracks. Cracks spoil the appearance of solid ice creams and their commodity value degenerates. In addition, a crack prevents the formation of an intended shape of ice cream. Furthermore, if ice cream is to be freeze-dried without the possibility of cracking, the size of ice cream is necessarily reduced; according to an experiment the maximum size is 22 mm×23 mm×15 mm.

Japanese Laid-open Patent Application No. 1-218554 teaches how to cover food with edible films such as oblate. The cover may be effective to prevent cracking but it is labor-consuming to cover individual ice creams. On the other hand, the cover, even if it is very thin, is likely to spoil the flavor of ice creams.

There is another proposal for preventing cracking in the freezing and drying process. The proposed process teaches that a reduced amount of solid content is used in the starting material. This proposed process may be effective to prevent cracking, but the resulting ice creams are susceptible to vibration and shock during transportation, and are less resistant to moisture, thereby causing collapse of the shape.

BRIEF SUMMARY OF THE INVENTION

The present invention is directed to overcome the difficulties of the known freeze-dried confections, and is to provide freeze-dried confections which are free from cracks and have shape stability over time.

According to one aspect of the present invention, the freeze-dried confection obtained by freezing and then freeze-drying a starting material containing a milk content and a sweetener content, wherein at least 20% wt of the sweetener content is sugar-alcohol, wherein the sweetener content consists of a sugar-base sweetener and nonsugar-base sweetener. The sugar-base sweetener can be sucrose, lactose, fructose, honey, fructooligo or any other oligosaccharide, or any other kinds of sugar-alcohol. The nonsugar-base sweetener can be aspartame, saccharin, stevia, or glycyrrhizin. Preferably, the sugar-alcohol to be added as a sweetener is one or more selected from the group consisting of erythritol, xylitol, sorbitol, and mannitol. It is especially preferred that either erythritol or xylitol is selected because of the increased palatable solubility, heat-absorbing or cooling taste, low calorie and low cariosity. The present invention is based upon the discovery that when the sugar-alcohol content is higher, the confection has less crack, and better shape stability. It is also possible to use a sweetener content consisting of 100% wt sugar-alcohol. In this specification the 'wt' stands for 'by weight'.

A problem is that a higher sugar-alcohol content makes the confection less sweet. To compensate for this lack of sweetness, one or more of other kinds of sweetener selected from the group consisting of monosaccharide, disaccharide, trisaccharide, oligosaccharide, and polysaccharide is preferably added. Inulin is preferred in that it not only promotes lactobacillus bifidus in human intestine but also increases the shape stability of freeze-dried confections. Inulin is a species of oligosaccharide, so that the present invention regards inulin as a sweetener. Therefore, even if inulin is added as esculent fiber, it is treated as the addition of sweetener. When the rest of the sweetener is lactose or oligosaccharide, the sugar-alcohol content preferably occupies 40% wt or more in the sweetener content.

It is preferred that a sweetener content does not exceed 15% wt in the starting material. This amount ensures that little crack occurs, and the shape stability is maintained.

It is also preferred that the starting material contains 0.1 to 10.0% wt of soybean protein. The soybean protein content is also effective to prevent cracking, and increase the shape stability.

According to another aspect of the present invention, the freeze-dried confections contains 0.01% wt to 5.0% wt of stabilizer, wherein the stabilizer is one or more selected from the group consisting of agar, gelatin, gum, pectin, carageenan, sodium alginate, sodium cascin, and CMC (carboxymethyl cellulose), preferably agar, gelatin, and gum. In cases where inulin is contained in the sweetener, the shape stability is enhanced, thereby eliminating the necessity of adding a stabilizer, or at least reducing the amount of it. This does not mean that the use of inulin and a stabilizer is not essential for the freeze-dried confections of the present invention.

The amount of solid content in the starting material is preferably in the range of 15% wt to 50% wt. When the percentage is lower than the lower limit, less crack is produced but this advantage is traded off by the reduced shape stability. When the percentage is higher than the upper limit, the shape stability increases but this advantage is traded off by the formation of more cracks. Thus, when the amount of solid content is in the range of 15% wt to 50% wt, less crack is formed and the shape stability is maintained. These two advantages are doubled by the addition of sugar-alcohol. Preferably, the solid content is 20% wt to 45% wt, and more preferably, 25% wt to 40% wt.

Prior to starting the freeze-drying process, air is preferably mixed with the starting material of ice cream. The air increases the volume of the starting material wherein the overrun rate is preferably 20% to 120%. In general, a higher overrun rate increases the palatable solubility of ice cream but produces cracks on its solid surface. A low overrun rate prevents cracking but decreases the palatable solubility. When the overrun rate is 30% to 90%, preferably 40% to 85%, the freeze-dried ice creams are free from cracks and keeps palatable solubility. When the percentage of solid content is high, the freeze-dried ice cream tastes favorably thick, and therefore, a higher overrun rate is desirable to give an agreeable palatable taste.

So far ice cream, as representative of the dehydrated frozen confections, has been described. In this specification, the dehydrated frozen confection is not limited to ice cream but includes freeze-dried milk-base desserts. The confection of the present invention is usually used as it is, but it can be also used as a material for processing other kind of frozen confection; that is, the confection is dissolved in milk or water or both, mixed with air, and then frozen.

DETAILED DESCRIPTION OF THE INVENTION

The present invention will be more particularly described by way of examples, wherein the percents in the description and drawings are in terms of weight:

Example 1

This was designed to produce freeze-dried ice cream containing a mixture of 15% or more of milk solid and 8% or more of milk fat.

A freeze-dried ice cream was produced in accordance with Table 1. More specifically, a starting material was obtained by mixing and dissolving the ingredients in Table 1 in the indicated proportions. Then the solution was homogenized, aged, and frozen into a slurry-state. The slurry-state ice cream was packed in a mold, and frozen into a solid-state. Finally, the solid-state ice cream was freeze-dried. The mixing, dissolving, filtering, homogenizing, pasteurizing, aging, the first-occurring freezing, the second-occurring freezing and the freeze-drying were all performed in a known manner. The overrun rate in the first-occurring freezing was 50%.

In Example 1 erythritol was solely used as the sweetener; Table 1 shows that 8.0% of it was added. PSM (processed soy material) was added by 1.2% wt as soybean protein. Gelatin was added by 0.5% wt as a stabilizer. The solid content occupied 28.8% as shown in Table 1.

The Contrasted Example 1 was obtained by freeze-drying ice cream known as a high quality ice cream, containing the ingredients shown in Table 1. The sweetener was granulated sugar.

The comparison between Example I and Contrasted Example 1 indicates that Example 1 had no cracks whereas Contrasted Example 1 had them. Example 1 had a better shape stability than Contrasted Example 1. Regarding the palatal smoothness and cooling taste Example 1 was found better than Contrasted Example 1; that is, Example 1 was more fresh and smooth on the tongue than Contrasted Example 1, because of the erythritol content in Example 1. Furthermore, it was ascertained that the gelatin in Example 1 enhanced its surfacial smoothness.

The freeze-dried ice cream was formed in a block (a solid mass), and was tested for possible cracking. In the case of using granulated sugar alone, it was ascertained that when the block was 22 mm×23 mm×15 mm or more, a crack occurred. In the case of using erythritol, when the block was 35 mm×33 mm×18 mm, 65 mm×50 mm×25 mm, and 58 mm×53 mm×8 mm, no crack was found in each size.

TABLE 1

|  | Ex. 1 | C.Ex. 1 |
|---|---|---|
| Fat milk content | 10.8 | 15.0 |
| Nonfat milk solids | 1.1 | 1.5 |
| Defatted milk | 5.7 | 10.0 |
| Sweetener content | 8.0 | 14.0 |
| Egg yolk | 1.4 | 2.5 |
| Emulsifier | 0.1 | 0.1 |
| PSM | 1.2 | — |
| Gelatin | 0.5 | — |
| Water | 71.2 | 56.9 |
| Total | 100.0 | 100.0 |

(Note)
1) Ex. Stands for Example, and C.Ex. stands for Contrasted Example.
2) Each substance, except Water, has its water content excluded.

Example 2

Xylitol was used as the sweetener. Freeze-dried ice cream was obtained by using a starting material containing a mixture of the ingredients listed in Table 2. It was ascertained that the product has no crack. In Tables 2 and 3, 'OR' means an overrun rate, (−) means 'formation of no crack', and (±) means that 10 to 20% of all the samples had cracks.

TABLE 2

|  | Ex. 2 |
|---|---|
| Unprocessed cream | 17.0 |
| Defatted milk | 7.4 |
| Xylitole | 7.4 |
| Egg yolk | 2.6 |
| Emulsifier | 0.1 |
| Water | 65.5 |
| Total | 100.0 |
| OR (%) | 27.1 |
| Cracks | — |

Examples 3 to 5

In Examples 3 to 5 and Contrasted Examples 2 to 4 freeze-dried ice cream was obtained by using erythritol and granulated sugar as the sweeteners. As indicated in parentheses in Table 3, the proportions of these substances to the sweetener were changed. Specifically, in Example 3, erythritol was 40%, in Example 4 it was 30%, and in Example 5, it was 20%. Likewise, in Contrasted Example 2, it was 15%, in Contrasted Example 3 it was 10%, and in Contrasted Example 4 it was 5%. In these Examples 3 to 5 and Contrasted Examples 2 to 4 the total amount of erythritol and granulated sugar was 7.4% of the total content.

As indicated in Table 3, Examples 3 to 5 had no crack, whereas 10 to 20% of all the samples in Contrasted Examples 2 to 4 had cracks.

TABLE 3

|  | Ex. 3 | Ex. 4 | Ex. 5 | C.Ex. 2 | C.Ex. 3 | C.Ex. 4 |
|---|---|---|---|---|---|---|
| Unprocessed cream | 21.3 | 21.3 | 21.3 | 17.0 | 17.0 | 17.0 |
| Defatted milk | 5.3 | 5.3 | 5.3 | 7.4 | 7.4 | 7.4 |
| Erythritol | 2.96 (40) | 2.22 (30) | 1.48 (20) | 1.11 (15) | 0.74 (10) | 0.37 (5) |
| Granulated sugar | 4.44 (60) | 5.18 (70) | 5.92 (80) | 6.29 (85) | 6.66 (90) | 7.03 (95) |
| Egg yolk | 2.6 | 2.6 | 2.6 | 2.6 | 2.6 | 2.6 |
| Emulsifier | 0.1 | 0.1 | 0.1 | 0.1 | 0.1 | 0.1 |
| Water | 63.3 | 63.3 | 63.3 | 65.5 | 65.5 | 65.5 |
| Total | 100.0 | 100.0 | 100.0 | 100.0 | 100.0 | 100.0 |
| OR (%) | 39.7 | 66.6 | 45.0 | 42.6 | 30.7 | 22.0 |
| Cracks | — | — | — | ± | ± | ± |

Examples 6 and 7

In Examples 6 and 7 freeze-dried ice cream was obtained by using erythritol and lactose as the sweeteners. As indicated in Table 4, erythritol was used by 40% wt in Example 6, and by 60% wt in Example 7. Neither of Examples 6 or 7 had any crack. Although not shown, when the sweetener content was 73.6% erythritol and 26.4% lactose, no crack was formed.

TABLE 4

|  | Ex. 6 | Ex. 7 |
|---|---|---|
| Unprocessed cream | 25.0 | 25.0 |
| Defatted milk | 5.3 | 5.3 |
| Erythritol | 3.4(40) | 5.04(60) |
| Lactose | 5.0(60) | 3.36(40) |
| Egg yolk | 2.6 | 2.6 |

TABLE 4-continued

|  | Ex. 6 | Ex. 7 |
|---|---|---|
| PSM | 1.2 | 1.2 |
| Water | 57.5 | 57.5 |
| Total | 100.0 | 100.0 |
| Cracks | — | — |

In Examples 8 and 9 freeze-dried ice cream was obtained by using erythritol and inulin as the sweeteners. In Example 8 the erythritol content was 40% in the sweetener as indicated in Table 5. In Example 9 it was 88%. No crack was formed in either of Examples 8 or 9. Although not shown, testes were conducted where the erythritol content was 60% and the inulin content was 40%, and when the erythritol content was 79% and the inulin content was 21%. No crack was formed in any of these examples.

TABLE 5

|  | Ex. 8 | Ex. 9 |
|---|---|---|
| Unprocessed cream | 25.0 | 25.0 |
| Defatted milk | 5.3 | 5.3 |
| Erythritol | 3.4(40) | 7.4(88) |
| Inulin | 5.0(60) | 1.0(12) |
| Egg yolk | 2.6 | 2.6 |
| PSM | 1.2 | 1.2 |
| Water | 57.5 | 57.5 |
| Total | 100.0 | 100.0 |
| Cracks | — | — |

Examples 10 to 13

In Examples 10 to 13 (See Table 6) freeze-dried ice cream was obtained by using the starting material containing erythritol and inulin as the sweeteners. In general, when the percentage of solid content and an overrun rate are high, more crack was produced. To demonstrate it, Examples 10 to 13 were conducted by setting the percentage of solid content to 35.6% wt, 35.9% wt, 37.1% wt, and 34.7% wt in Examples 10, 11, 12, and 13, respectively, in contrast to Example 1 where it was 28.8% wt. Likewise, the overrun rate in each of Examples 10 to 13 was set to 80% in contrast to Example 1 where it was 50%. In addition, to increase the commodity value, lactoferrin, an appropriate flavorant, and a pigment were added. Examples 10 to 13 had no crack.

TABLE 6

|  | Ex. 10 | Ex. 11 | Ex. 12 | Ex. 13 |
|---|---|---|---|---|
| Fat milk content | 12.3 | 12.3 | 12.3 | 11.2 |
| Erythritol | 9.0 | 9.0 | 9.0 | 7.4 |
| Nonfat milk solids | 7.7 | 7.7 | 7.7 | 10.8 |
| Egg yolk | 3.5 | 3.5 | 3.5 | 2.6 |
| PSM | 1.5 | 1.5 | 1.5 | 1.2 |
| Inulin | 1.2 | 1.2 | 1.2 | 1.0 |
| Lactoferrin | 0.2 | 0.2 | 0.2 | 0.2 |
| Flavoring | 0.1 | 0.2 | 0.1 | 0.1 |
| Stabilizer | 0.1 | 0.1 | 0.1 | 0.1 |
| Pigment | — | 0.2 | — | — |
| Cocoa | — | — | 1.5 | — |

TABLE 6-continued

|  | Ex. 10 | Ex. 11 | Ex. 12 | Ex. 13 |
|---|---|---|---|---|
| Yogurt culture | — | — | — | 0.1 |
| Water | 64.4 | 64.1 | 62.9 | 65.3 |
| Total | 100.0 | 100.0 | 100.0 | 100.0 |

(note)
Each substance, except Water, has its water content excluded.

According to the present invention, the following advantages can be obtained:

(1) The freeze-dried confections are free from cracks, and have shape stability. This advantage is especially enhanced when the sugar-alcohol content consists of one or more of erythritol, xylitol, sorbitol, and mannitol. To increase this advantage, the confection of the present invention has its sweetener content raised up to 15% wt in the starting material.

(2) When the starting material contains soybean protein by 0.1 to 10% by weight, the resulting confections are far freer from crack, and have an increased shape stability.

(3) When the starting material contains a stabilizer by 0.01 to 5.0% by weight, the resulting confections are not only free from crack and have shape stability, but also are safe from having an unfavorable powdery surface.

(4) When the percentage of solid content is in the range of 15% wt to 50% wt, the resulting confections are far freer from crack, and have an increased shape stability.

(5) When the overrun rate is 20 to 120%, the palatal solubility is increased, and the ice cream is free from crack.

(6) When Inulin is used as a sweetener other than sugar-alcohol, a stabilizer can be dispensed with or at least its amount can be reduced, thereby saving the production cost.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A dehydrated frozen ice cream obtained by freezing and then freeze-drying a starting material containing a milk content and a sweetener content, wherein at least 20% wt of the sweetener content is sugar selected from erythritol, xylitol and mixtures thereof.

2. The dehydrated frozen ice cream according to claim 1, wherein the rest of the sweetener content consists of one or more selected from the group consisting of monosaccharide, disaccharide, trisaccharide, oligosaccharide, and polysaccharide.

3. The dehydrated frozen ice cream according to claim 1, wherein the rest of the sweetener content contains inulin.

4. A dehydrated frozen ice cream obtained by freezing and then freeze-drying a starting material containing a milk content and a sweetener content, wherein at least 40% wt of the sweetener content is selected from erythritol, xylitol and mixtures thereof and the rest of it consists of at least one of lactose or oligosaccharide.

5. A dehydrated frozen ice cream obtained by freezing and then freeze-drying a starting material containing a milk content and a sweetener content, wherein the sweetener content consists of sugar-alcohol.

6. The dehydrated frozen ice cream according to claim 1, wherein the sweetener content is in the range of 10.0% wt to 15% wt in the starting material.

7. The dehydrated frozen ice cream according to claim 1, wherein the starting material contains 0.1 to 10.0% wt of soybean protein.

8. The dehydrated frozen ice cream according to claim 1, wherein the starting material contains 0.01% wt to 5.0% wt of a stabilizer.

9. The dehydrated frozen ice cream according to claim 1, wherein the solid content is in the range of 15% wt to 50% wt in the starting material.

10. The dehydrated frozen ice cream according to claim 1, wherein the freeze-drying process of the starting material is preceded by adding air thereto with an overrun rate being in the range of 20% to 120%.

* * * * *